US005524915A

United States Patent [19]

Liu

[11] Patent Number: 5,524,915

[45] Date of Patent: Jun. 11, 1996

[54] MULTI-PURPOSE REPAIR ASSEMBLY

[75] Inventor: Lien C. Liu, Taichung, Taiwan

[73] Assignee: Chao Li Smeltion Co., Ltd., Taichung, Taiwan

[21] Appl. No.: 407,114

[22] Filed: Mar. 20, 1995

[51] Int. Cl.[6] .................................................. B62B 11/00

[52] U.S. Cl. ......................... 280/30; 206/372; 280/32.6; 280/37; 280/648; 297/17

[58] Field of Search .................................. 206/372, 373; 280/30, 32.6, 35, 37, 87.01, 47.34, 47.35, 643, 648, 651; 297/17, 16.1

[56] References Cited

U.S. PATENT DOCUMENTS

| | | | |
|---|---|---|---|
| 1,226,585 | 5/1917 | Parker et al. | 280/32.6 |
| 2,487,706 | 11/1949 | Happ | 280/32.6 |
| 3,677,569 | 7/1972 | Larson | 280/32.6 |
| 4,889,352 | 12/1989 | Chamberlin, Jr. et al. | 280/30 X |
| 5,114,007 | 5/1992 | Chen | 206/373 |
| 5,318,312 | 6/1994 | Montemayor | 280/30 |
| 5,395,154 | 3/1995 | Wang | 280/30 X |

*Primary Examiner*—Margaret A. Focarino
*Assistant Examiner*—Michael Mar
*Attorney, Agent, or Firm*—Alfred Lei

[57] ABSTRACT

A multi-purpose repair assembly including a first member having two platforms, a first cavity between the two platforms, and two alcoves each at one side of each of the platforms, each of the two platforms being provided with two castors, a first drawer engaged with the first cavity of the first member, a second member pivotally connected with the first member, the second member having two indentations, a second cavity between the two indentations, and two shoulders each at one side of each of the two indentations, each of the shoulders being provided with a castor adapted to be received in a corresponding one of the alcoves of the second member, the second cavity being adapted to receive the two castors of the first member, and a second drawer engaged with the second cavity of the second member.

2 Claims, 7 Drawing Sheets

MULTI-PURPOSE REPAIR ASSEMBLY

BACKGROUND OF THE INVENTION

1. Field of the Invention

This invention relates to multi-purpose repair assembly.

2. Background of the Invention

It has been found that the repairman often has to bring a number of tools to go beneath a car in order to inspect or repair the car thereby causing much inconvenience in operation.

Therefore, it is an object of the present invention to provide a multi-purpose repair assembly which can obviate and mitigate the above-mentioned drawback.

SUMMARY OF THE INVENTION

This invention relates to a multi-purpose repair assembly.

It is the primary object of the present invention to provide a multi-purpose repair assembly which can be used as a tool case and a deck chair as well.

It is another object of the present invention to provide a multi-purpose repair assembly which is practical in use.

It is still another object of the present invention to provide a multi-purpose repair assembly which is simple in construction.

It is still another object of the present invention to provide a multi-purpose repair assembly which is low in cost.

It is a further object of the present invention to provide a multi-purpose repair assembly which is facile to manufacture.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
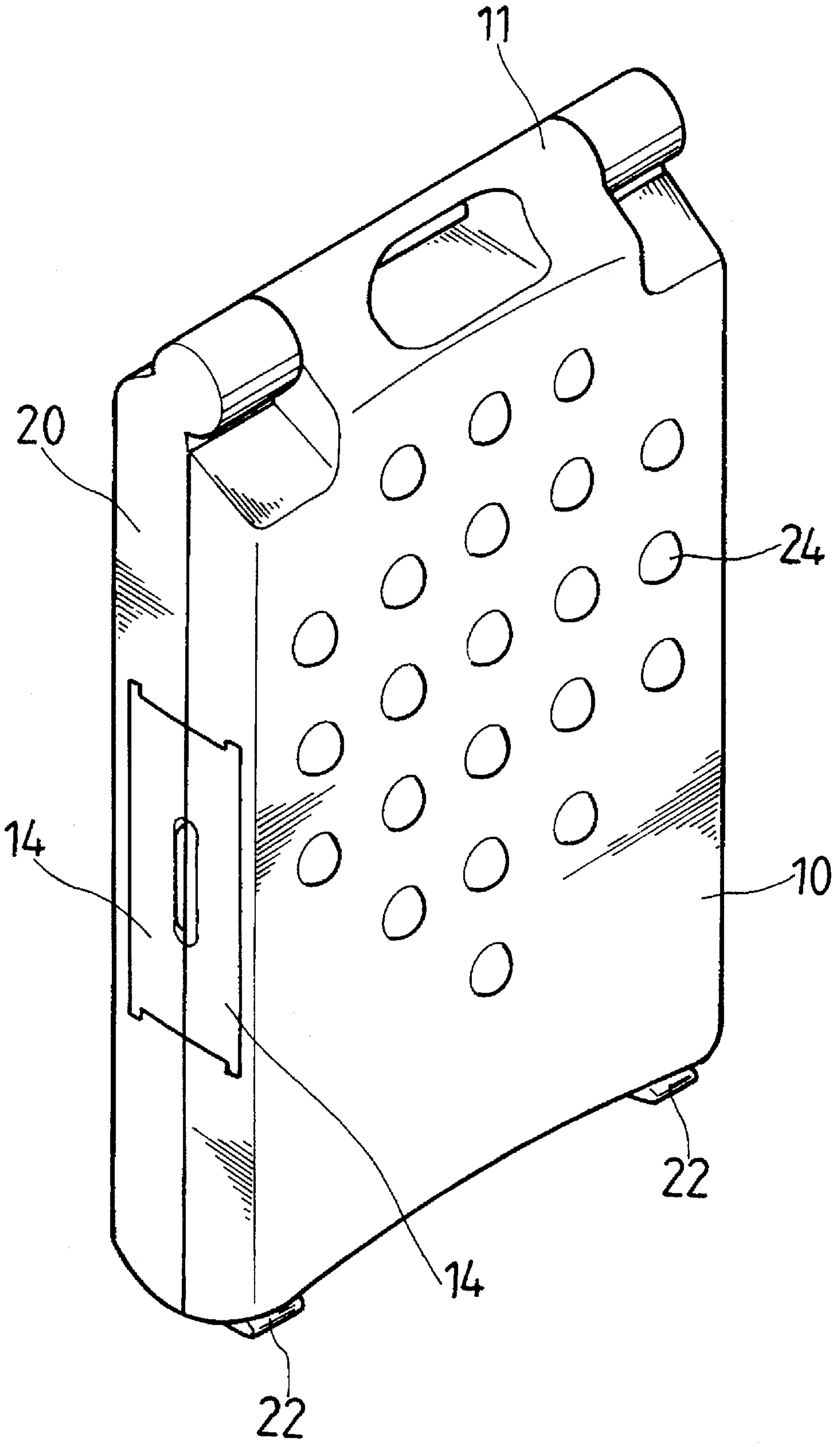
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
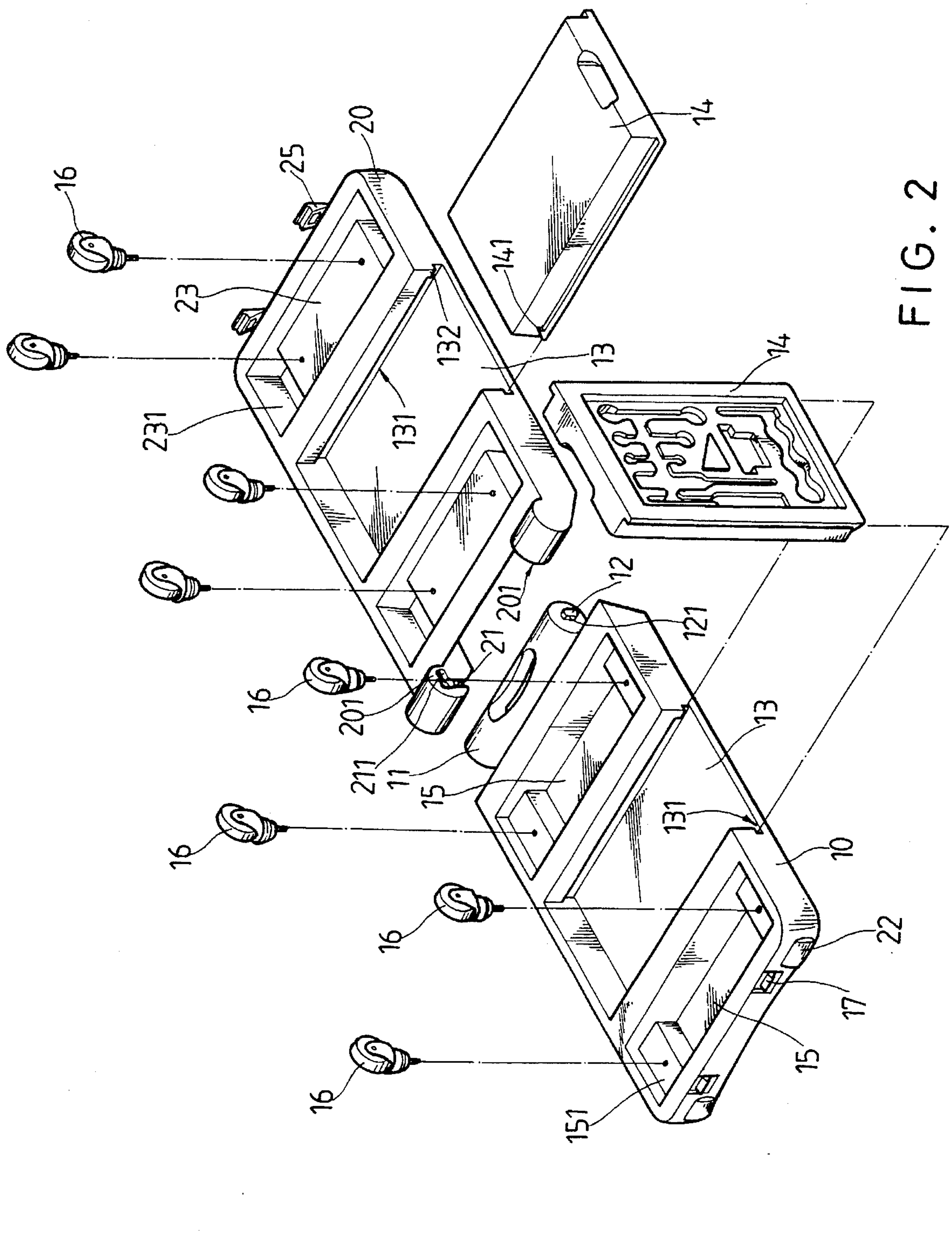
FIG. 2 is an exploded view of the present invention.
Figure 7:
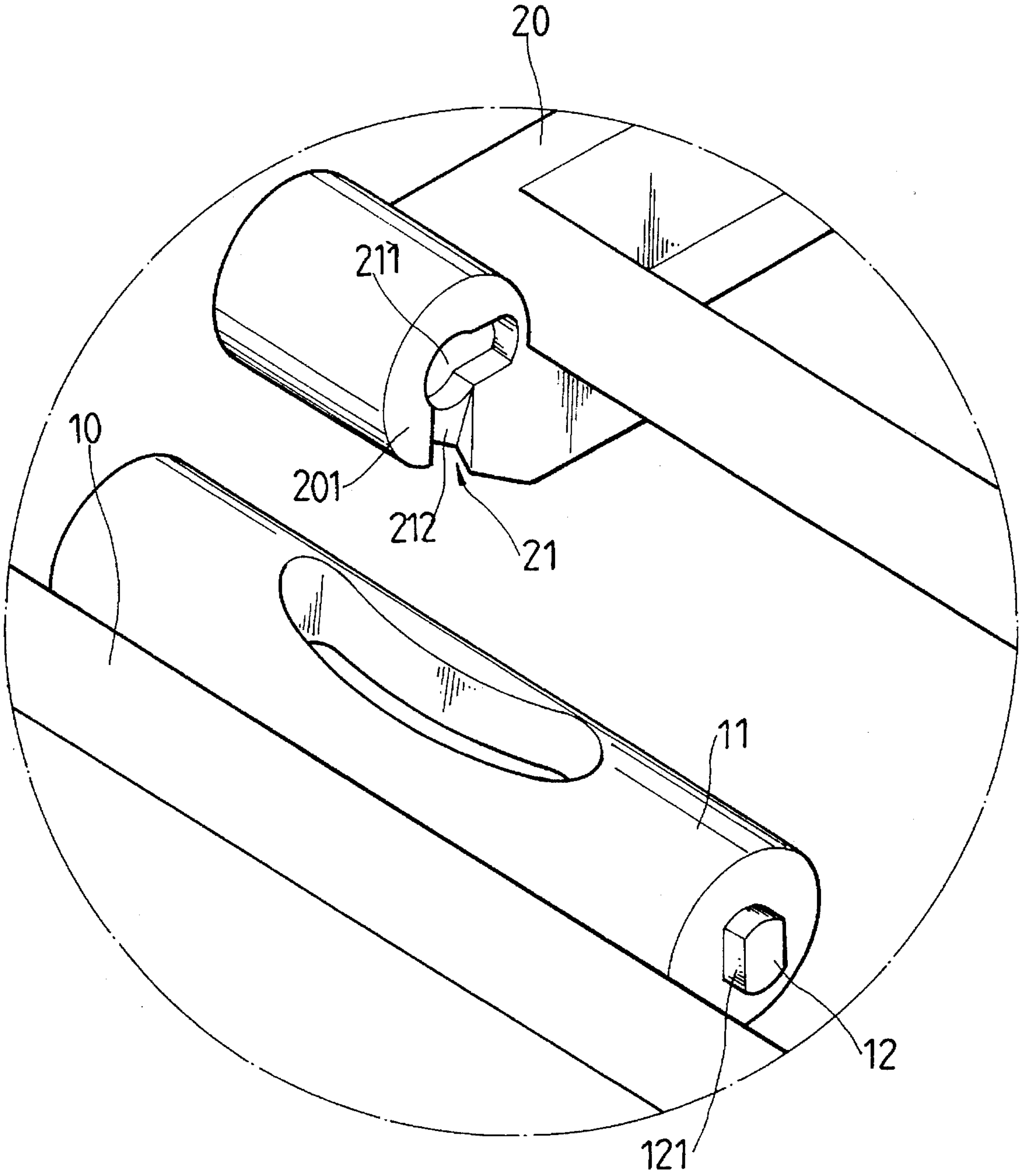
FIG. 7 is an enlarged fragmentary view of the present invention.

With reference to the drawings and in particular to FIGS. 1 and 2 thereof, the multi-purpose repairing assembly according to the present invention mainly comprises a first member 10 and a second member 20. The first member 10 is formed with a handle 11 which has a protrusion 12 at both ends. The protrusion 12 is formed with two parallel surfaces 121. The second member 20 has two cylindrical portions 201 having an inner end 201 formed with a L-shaped groove 21 (see FIG. 7) including a first recess 211 and a second recess 212. The first recess 211 is deeper than the second recess 212 and adapted to receive the protrusion 12 of the first member 10. Further, the second recess 212 gradually increases in depth towards its outer end. The first member 10 is rotatably connected with the second member 20 in the manner that the handle 11 of the first member 10 is fitted between the two cylindrical portions 201 of the second member 20. Hence, the first member 10 can be conveniently turned with respect to the second member 20 to form a deck chair (see FIGS. 3 and 4).

Both the first member 10 and the second member 20 are formed with a cavity 13 for receiving a drawer 14 for accommodating tools (not shown). The cavity 13 is formed at both sides with a slot 131 having a projection 132 at the outer end. The drawer 14 has a stopper 141 at both ends so as to prevent the drawer 14 from disengaging from the cavity 13. Both sides of the cavity 13 of the first member 10 are formed with an indentation 15 having a shoulder 151 at both ends. On each shoulder 151 is mounted a castor 16. Both sides of the cavity 13 of the second member 10 are formed with a platform 23 with an alcove 231 at both ends. On the platform 23 are mounted two castors 16. Hence, when the first member 10 is folded on the second member 20, the casters 16 of the first member 10 will be received within the alcoves 231 of the second member 20, while the casters 16 of the second member 20 will be received within the indentations 15 of the first member 10.

Figure 3:
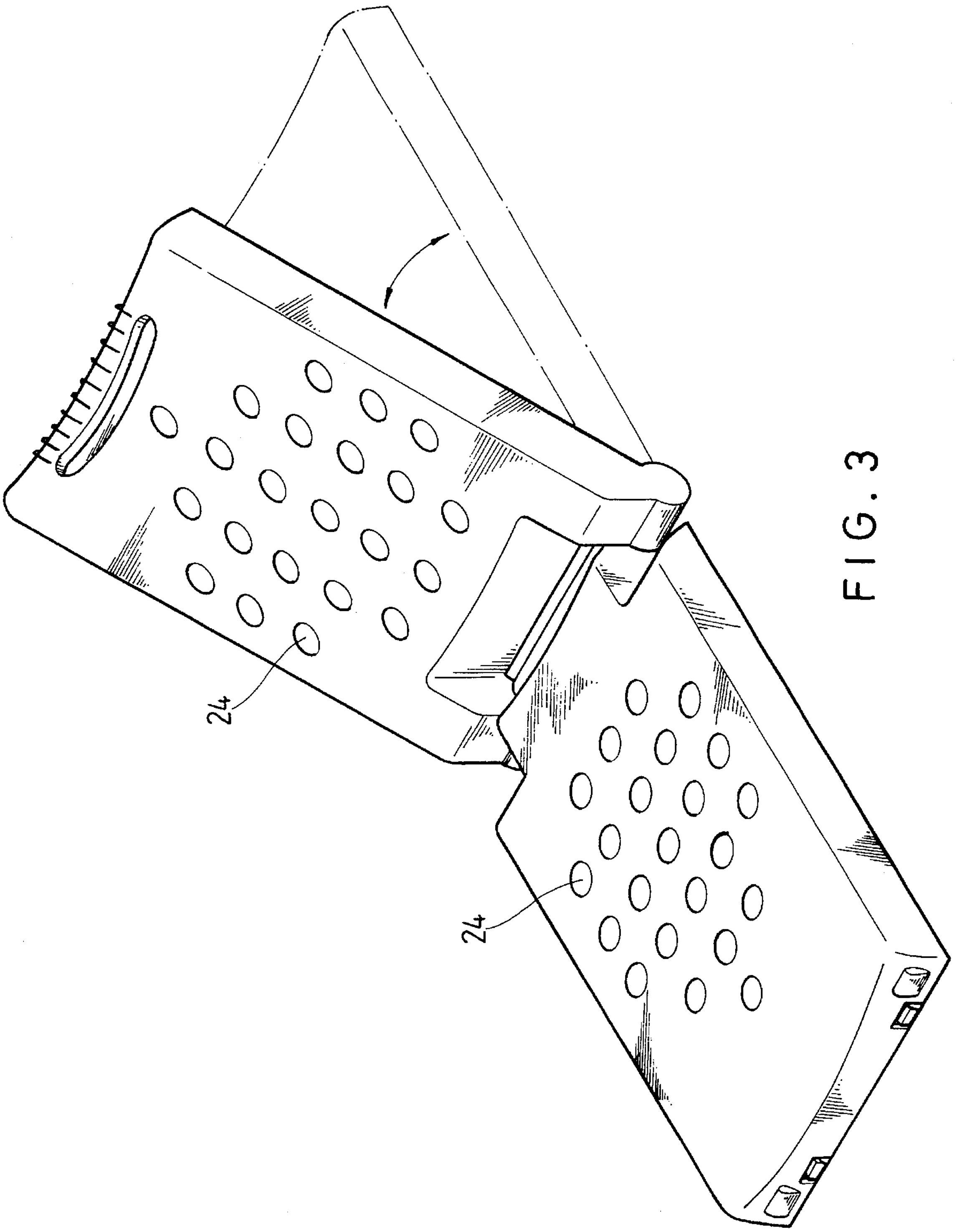
FIGS. 3 and 4 show the way to use the present invention as a deck chair.
Figure 4:
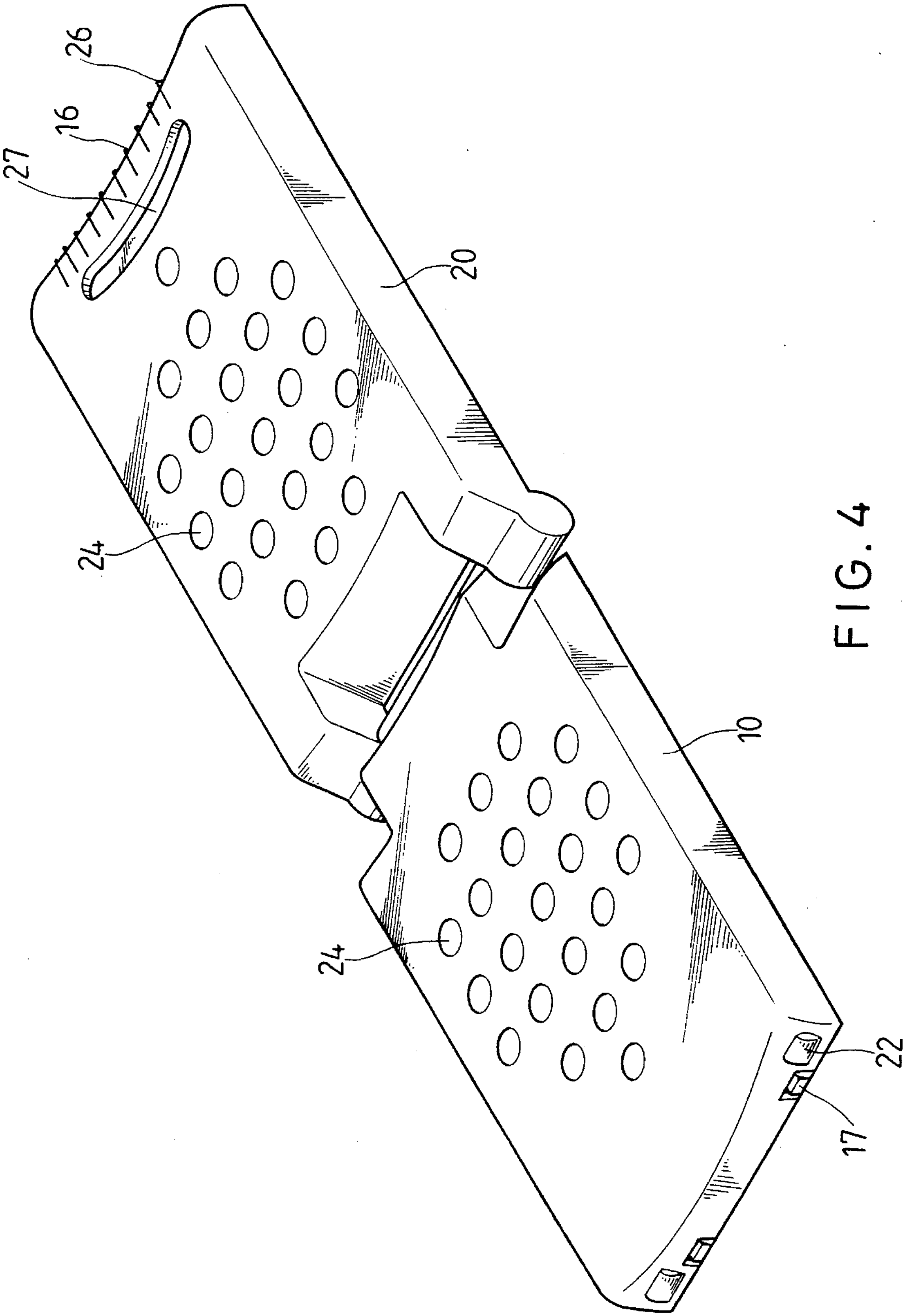

As shown in FIGS. 3 and 4, the first and second members 10 and 20 are formed with a curved upper surface having a plurality of projections 24 thereon.

Figure 5:
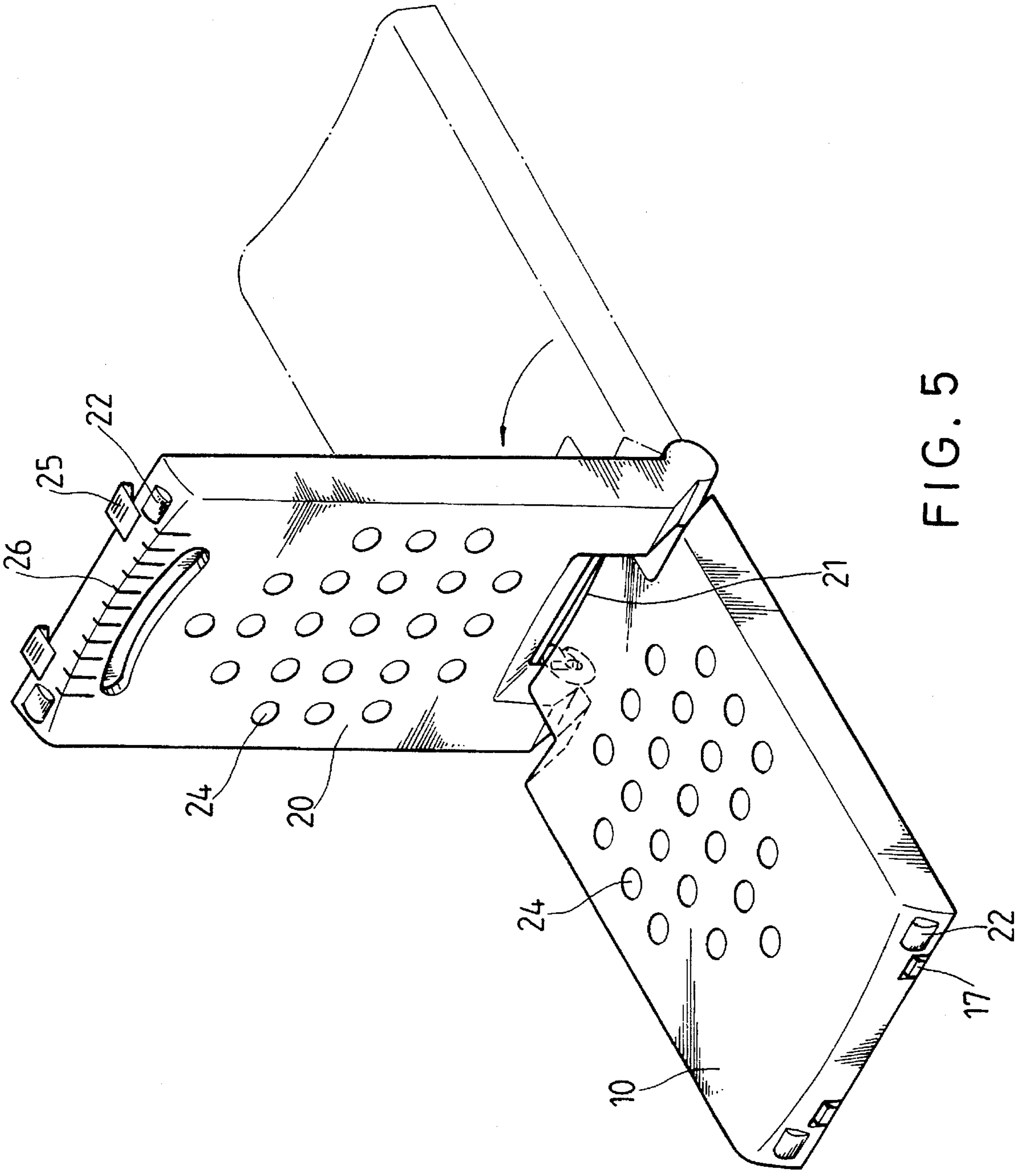
FIGS. 5 and 6 show the working principle of the present invention.
Figure 6:
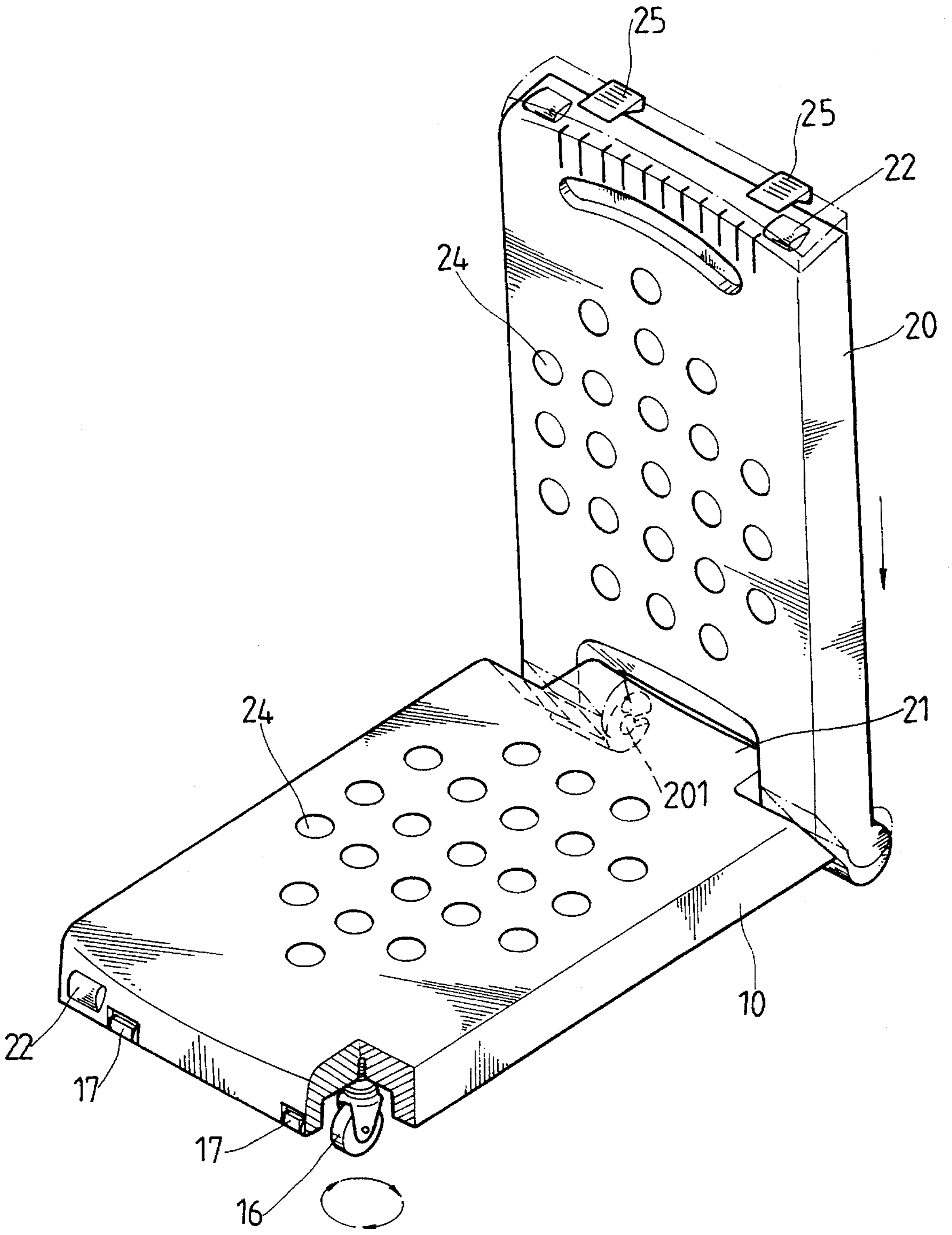

As shown in FIGS. 5 and 6, the first member 10 is provided with two female connectors 17 and two supporting feet 22 at the outer side, while the second member 20 has two male connectors engageable with the two female connectors 17 and two supporting feet 22 at the outer end.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A multi-purpose repair assembly comprising:

a first member having two platforms, a first cavity formed between the two platforms, and two alcoves formed at respective ends of each of said platforms, each of said two platforms being provided with two castors;

a first drawer engageable within the first cavity of said first member;

a second member pivotally connected with said first member, said second member having two indentations, a second cavity formed between the two indentations, and two shoulders formed at respective ends of each of the two indentations, each of said shoulders being provided with a castor, each castor of said second member being adapted to be received within a corresponding one of the alcoves of said first member and the castors of each of said two platforms of said first member being adapted to be received within corresponding indentations of said second members when said first and second members are folded together; and a second drawer engageable within the second cavity of said second member.

2. The multi-purpose repair assembly as claimed in claim 1, wherein said first member is provided with two female connectors and two supporting feet and said second member is provided with two male connectors engageable with said female connectors and two supporting feet.

* * * * *